(12) United States Patent  
Nakamura

(10) Patent No.: US 8,272,751 B2
(45) Date of Patent: Sep. 25, 2012

(54) DISPLAY APPARATUS HAVING A TUBULAR REFLECTING SURFACE

(75) Inventor: Norio Nakamura, Matsumoto (JP)

(73) Assignee: Seiko Epson Corporation (JP)

( * ) Notice: Subject to any disclaimer, the term of this patent is extended or adjusted under 35 U.S.C. 154(b) by 319 days.

(21) Appl. No.: 12/722,896

(22) Filed: Mar. 12, 2010

(65) Prior Publication Data

US 2010/0259726 A1 Oct. 14, 2010

(30) Foreign Application Priority Data

Apr. 14, 2009 (JP) .................................. 2009-097702
Jan. 19, 2010 (JP) .................................. 2010-008808

(51) Int. Cl.
G03B 21/28 (2006.01)
G03B 21/14 (2006.01)
G02B 6/10 (2006.01)
G02B 5/30 (2006.01)
G02B 27/28 (2006.01)
G03H 1/00 (2006.01)

(52) U.S. Cl. ................ 353/98; 353/20; 353/84; 385/11; 385/129; 385/133; 362/551; 359/34; 359/491.01

(58) Field of Classification Search .................... 353/20, 353/84, 98; 385/11, 129, 133; 362/551; 359/34, 491.01

See application file for complete search history.

(56) References Cited

U.S. PATENT DOCUMENTS 7,556,413 B2 7/2009 Kurihara et al.
2010/0110386 A1 * 5/2010 Handschy et al. ............... 353/20

FOREIGN PATENT DOCUMENTS

| JP | 2005-140837 | 6/2005 |
| JP | 2007-265626 | 10/2007 |
| JP | 2007-265627 | 10/2007 |
| JP | 2009-216822 | 9/2009 |
| JP | 2009-216823 | 9/2009 |
| JP | 2009-216824 | 9/2009 |

* cited by examiner

Primary Examiner — Georgia Y Epps
Assistant Examiner — Magda Cruz
(74) Attorney, Agent, or Firm — Harness, Dickey & Pierce, P.L.C.

(57) ABSTRACT

A display apparatus includes: a light modulator having translucent windows; a light emitter having a light source; a light guide having a tubular reflecting surface guiding light source light to the light modulator; and a light separator having a light separation surface separating guided light into transmitted and reflected light. The tubular reflecting surface narrows from the light modulator toward the light emitter to guide the reflected light to the windows. Denoting a lateral cross-sectional area of an inside area of the tubular reflecting surface at a light source end as $S_1$, a lateral cross-sectional area of the tubular reflecting surface at a light separation surface end as $S_2$, and a maximum incident angle at which light from the light source reflected by the tubular reflecting surface is input to the light separation surface as $\theta$, $\theta \times \sqrt{(S_2/S_1)} \geq 110$.

12 Claims, 9 Drawing Sheets

DISPLAY APPARATUS HAVING A TUBULAR REFLECTING SURFACE

BACKGROUND

1. Technical Field

The present invention relates to a display apparatus.

2. Related Art

A projection type display apparatus such as a projector or a display is provided with, for example, a light modulation element such as a liquid crystal light valve and a light source for applying light to the light modulation element, such as a light emitting diode (LED) or a laser diode (LD) (see e.g., JP-A-2005-140837 (a related art document)).

Further, the display apparatus according to the related art document is provided with a rod integrator disposed between the light modulation element and the light source. Further, the light from the light source is applied to the light modulation element via the rod integrator. By thus using the rod integrator, it is possible to uniformly irradiate a desired area of the light modulation element with the light from the light source.

Incidentally, although in the light modulation element such as a liquid crystal light valve, there are inevitably formed a portion for transmitting light and a portion for blocking the light, a proportion of the portion for transmitting the light to the entire light modulation element (the display area), namely a so-called aperture ratio, is low.

In the display apparatus according to the related art document, apart of the light emitted from the light source is diffused or absorbed by the portion for blocking the light described above, and is therefore wasted without being used. Therefore, a high-intensity light source device is required for displaying images with a desired brightness, which incurs increase in power consumption.

SUMMARY

An advantage of some aspects of the invention is to provide a display apparatus capable of displaying high-intensity and high-quality images while achieving low power consumption.

The advantage described above can be achieved by the following aspects of the invention.

A display device according to an aspect of the invention includes a light modulation section having a plurality of translucent window sections, a light emitting section having a light source adapted to emit light, a light guide section having a tubular reflecting surface having a function of guiding the light from the light source to the light modulation section, and a light separation section provided to the light modulation section and disposed in a vicinity of the light source in parallel to or in substantially parallel to a lateral cross-sectional surface of the tubular reflecting surface, and having a light separation surface having a function of separating the light from the light guide section into transmitted light transmitted toward the light modulation section and reflected light reflected toward the light guide section, wherein the tubular reflecting surface narrows from the light modulation section toward the light emitting section so as to guide the reflected light to the translucent window sections, denoting a lateral cross-sectional area of an inside area of the tubular reflecting surface at an end on the light source side as $S_1$, a lateral cross-sectional area of the tubular reflecting surface at an end on the light separation surface side as $S_2$, and a maximum incident angle at which the light from the light source reflected by the tubular reflecting surface is input to the light separation surface as $\theta[°]$, $\theta \times \sqrt{(S_2/S_1)}$ is equal to or greater than 110.

Thus, since the reflected light reflected by the light separation surface is used efficiently, the amount of light transmitted through the translucent window sections out of the light emitted from the light emitting section can be increased even if the intensity of the light source is relatively low. Therefore, it becomes possible to display high-intensity and high-quality images while achieving reduction of the power consumption.

In the display device according to the above aspect of the invention, it is preferable that the lateral cross-sectional area $S_1$ corresponds to a lateral cross-sectional area of the inside area of the tubular reflecting surface at an end near to the light source when an apical surface of the light source is located outer than the end of the tubular reflecting surface, and corresponds to a lateral cross-sectional area of the inside area of the tubular reflecting surface including the apical surface of the light source when the apical surface of the light source is located inner than the end of the tubular reflecting surface, and the lateral cross-sectional area $S_2$ corresponds to a lateral cross-sectional area of the inside area of the tubular reflecting surface at an end near to the light separation surface when the light separation surface is located outer than the end of the tubular reflecting surface, and corresponds to a lateral cross-sectional area of the inside area of the tubular reflecting surface including the light separation surface when the light separation surface is located inner than the end of the tubular reflecting surface.

Thus, since the reflected light reflected by the light separation surface is thus used efficiently, it becomes possible to display high-intensity and high-quality images while achieving reduction of the power consumption.

In the display device according to the above aspect of the invention, it is preferable that the light emitting section is disposed so as to cover one end of the inside area of the tubular reflecting surface, the light modulation section is disposed so as to cover the other end of the inside area of the tubular reflecting surface, and an area surrounded by the tubular reflecting surface, the light emitting section, and the light modulation section forms a closed area including the light source.

Thus, since undesirable leakage of the light from the inside area of the tubular reflecting surface to the outside can be prevented, and the reflected light reflected by the light separation surface is easily and surely used, it becomes possible to display high-intensity and high-quality images.

In the display device according to the above aspect of the invention, it is preferable that assuming one direction perpendicular to an axis line of the tubular reflecting surface as a first direction, and assuming a direction perpendicular to the axis line of the tubular reflecting surface and orthogonal to the first direction as a second direction, a ratio $L_{11}/L_{12}$ between a length $L_{11}$ of the lateral cross-sectional surface of the inside area of the tubular reflecting surface at the end on the light source side in the first direction and a length $L_{12}$ of the lateral cross-sectional surface of the inside area of the tubular reflecting surface at the end on the light source side in the second direction is in a range of ¼ through 4, and a ratio $L_{21}/L_{22}$ between a length $L_{21}$ of the lateral cross-sectional surface of the inside area of the tubular reflecting surface at the end on the light separation surface side in the first direction and a length $L_{22}$ of the lateral cross-sectional surface of the inside area of the tubular reflecting surface at the end on the light separation surface side in the second direction is in a range of ¼ through 4.

Thus, it becomes possible to guide the light evenly from the light source to the light separation surface via the light guide section, and at the same time, to guide the reflected light reflected by the light separation surface to the light separation surface while reflecting the reflected light by the tubular reflecting surface.

In the display device according to the above aspect of the invention, it is preferable that the light modulation section is provided with a polarization separation element adapted to transmit polarized light with a predetermined direction and reflect polarized light with a direction orthogonal to the predetermined direction disposed in a vicinity of the light source, and the polarization separation element has a function as the light separation surface.

Thus, the light not transmitted through the polarization separation element can be used efficiently.

In the display device according to the above aspect of the invention, it is preferable that a color filter having a plurality of wavelength selection sections is disposed in a vicinity of the light modulation section, at least one of the wavelength selection sections has a property of reflecting the light in a non-transmissive wavelength band, and the color filter has a function as the light separation surface.

Thus, the light not passing through the wavelength selecting section of the color filter can be used efficiently.

In the display device according to the above aspect of the invention, it is preferable that the plurality of wavelength selection sections is composed of wavelength selection sections for respective wavelength bands different from each other.

In the case of displaying an image using the wavelength selection sections of two or more colors (e.g., the case of displaying a full-color image using the wavelength selection sections of three colors, red (R), green (G), and blue (B)), the aperture ratio of the light modulation section becomes extremely low. Therefore, the advantage obtained by applying the aspect of the invention becomes remarkable.

In the display device according to the above aspect of the invention, it is preferable that a light blocking layer adapted to block light is partially disposed correspondingly to wiring provided to the light modulation section, and the light blocking layer has light reflectivity, and a function as the light separation surface.

In the case of displaying an image using the wavelength selection sections of two or more colors (e.g., the case of displaying a full-color image using the wavelength selection sections of three colors, red (R), green (G), and blue (B)), the aperture ratio of the light modulation section becomes extremely low. Therefore, by applying the aspect of the invention, it becomes possible to efficiently use the light blocked by the light blocking layer, and the advantage thereof becomes remarkable.

In the display device according to the above aspect of the invention, it is preferable that a polarization separation element adapted to transmit polarized light with a predetermined direction and reflect polarized light with a direction orthogonal to the predetermined direction is disposed between the light blocking layer and the light modulation section.

Thus, since the polarization separation element does not exist between the light source and the light blocking layer, the light blocked by the light blocking layer can more efficiently be used.

In the display device according to the above aspect of the invention, it is preferable that the light applied to the light modulation section is arranged to become substantially white light.

Thus, it becomes possible to easily realize full-color images by the combination with, for example, a color filter.

In the display device according to the above aspect of the invention, it is preferable that the light emitting section has a fluorescent substance disposed in a vicinity of the light source, and the light source emits excitation light for exciting the fluorescent substance.

Most of the reflected light reflected by the light separation surface is guided to the translucent window sections by the tubular reflecting surface, and the remaining portion is guided to the light source. Therefore, the light corresponding to the remaining portion can be used for excitation of the fluorescent substance. As a result, the luminance of the image can be improved.

In the display device according to the above aspect of the invention, it is preferable that color temperature of the light the light emitting section emits is arranged to become equal to or higher than 6500 K.

Thus, as a result of using the reflected light reflected by the light separation surface for exciting the fluorescent substance, it is possible to achieve balance between the excitation light and the fluorescence to thereby keep a preferable color balance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Display apparatuses as exemplary embodiments of the invention will hereinafter be described with reference to the accompanying drawings.

First Embodiment

Figure 1:
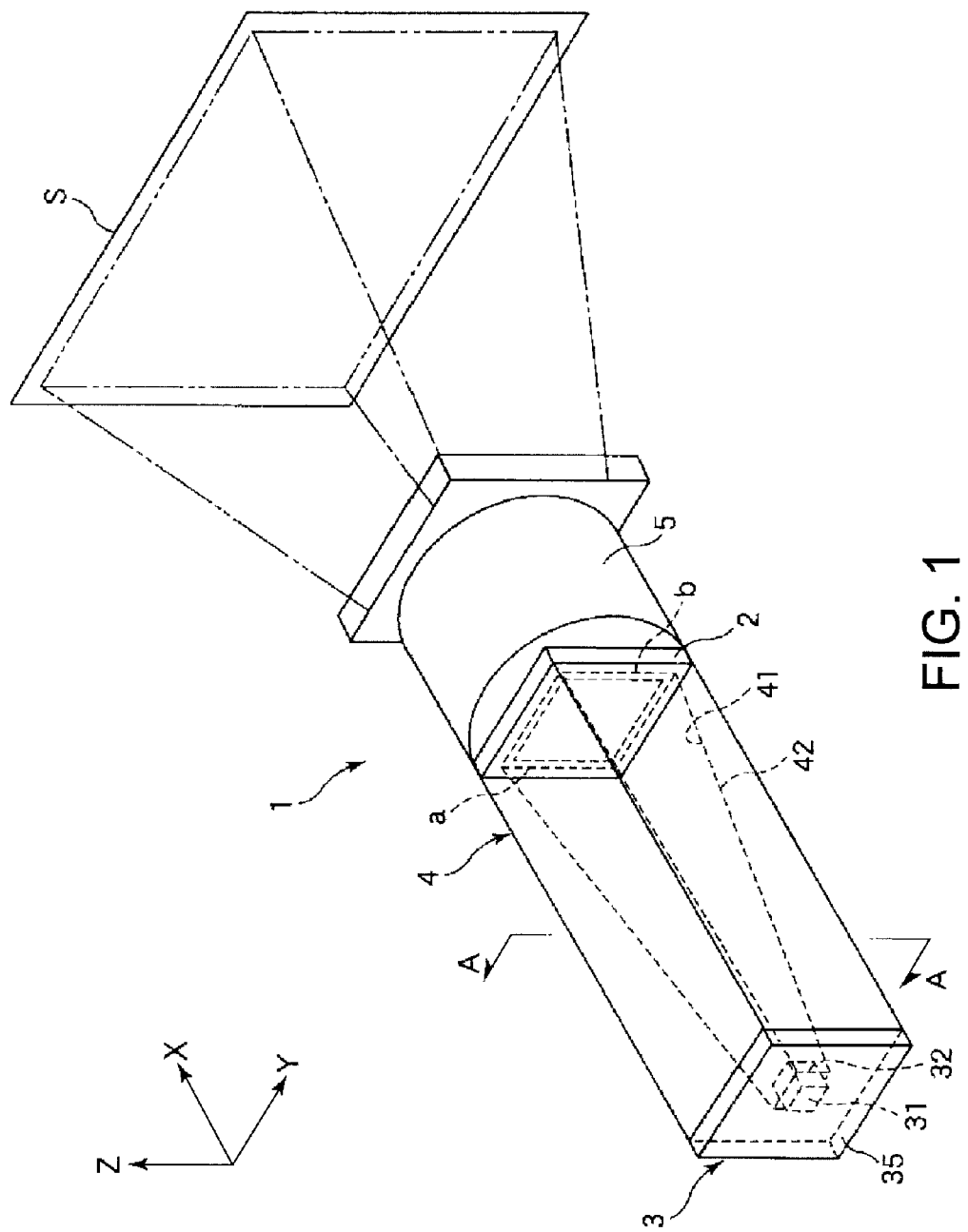
FIG. 1 is a perspective view showing a schematic configuration of a display device according to a first embodiment of the invention.
Figure 2:
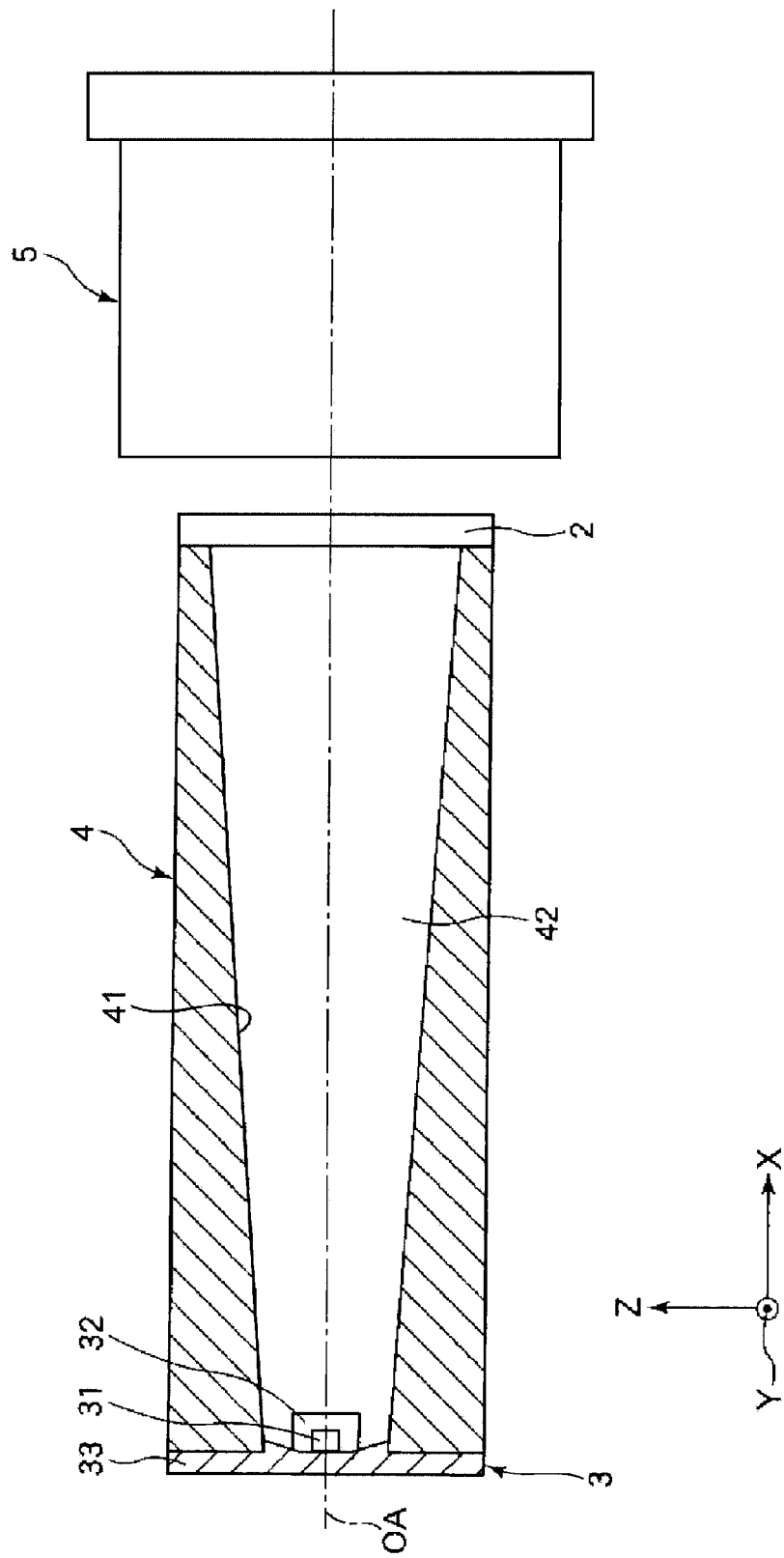
FIG. 2 is a vertical cross-sectional view (a cross-sectional view along the line A-A in FIG. 1) of the display apparatus shown in FIG. 1.
Figure 3:
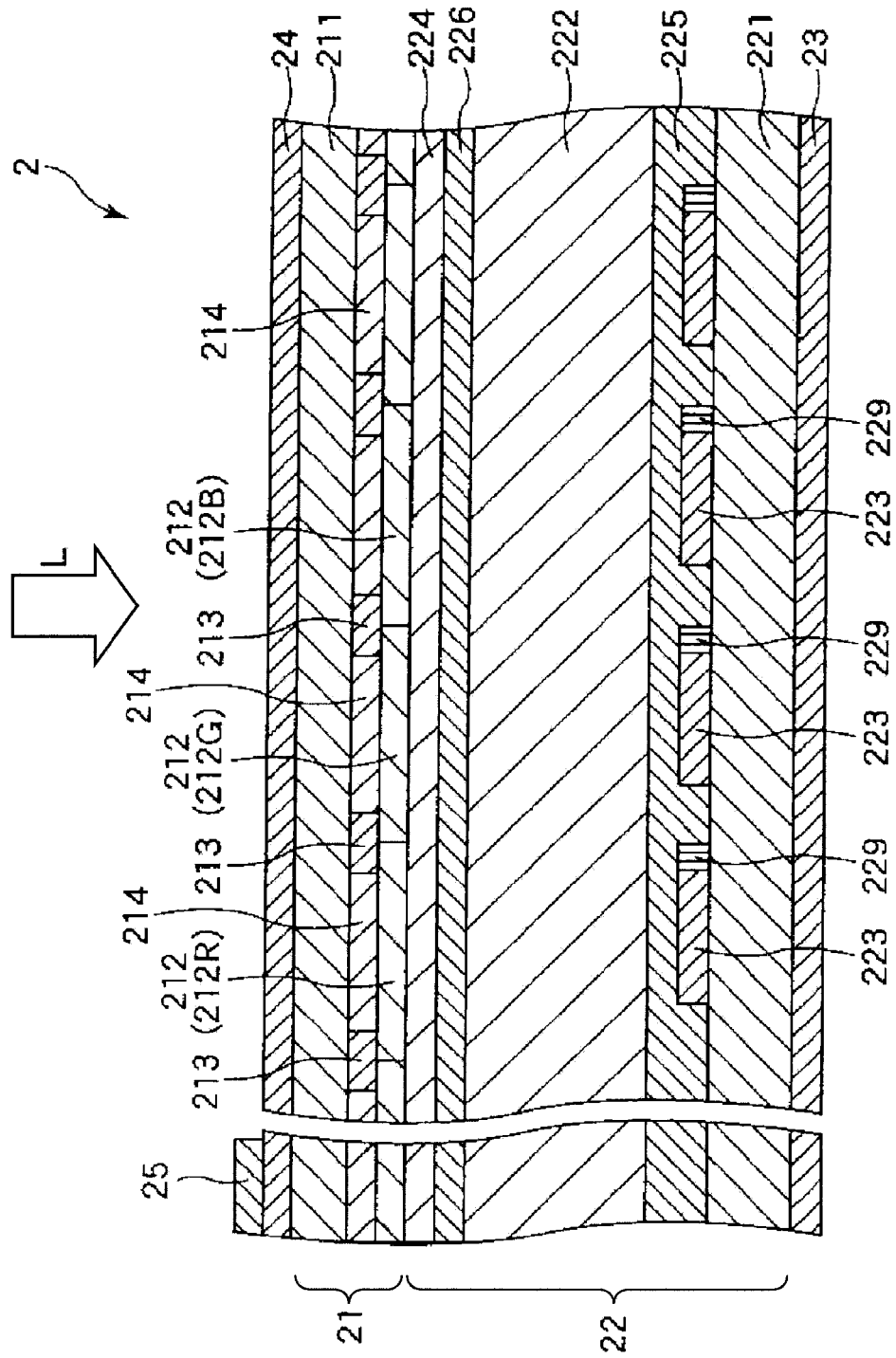
FIG. 3 is a cross-sectional view showing a schematic configuration of a light modulation device (a light modulation section and a light separation section) shown in FIG. 2.
Figure 4:
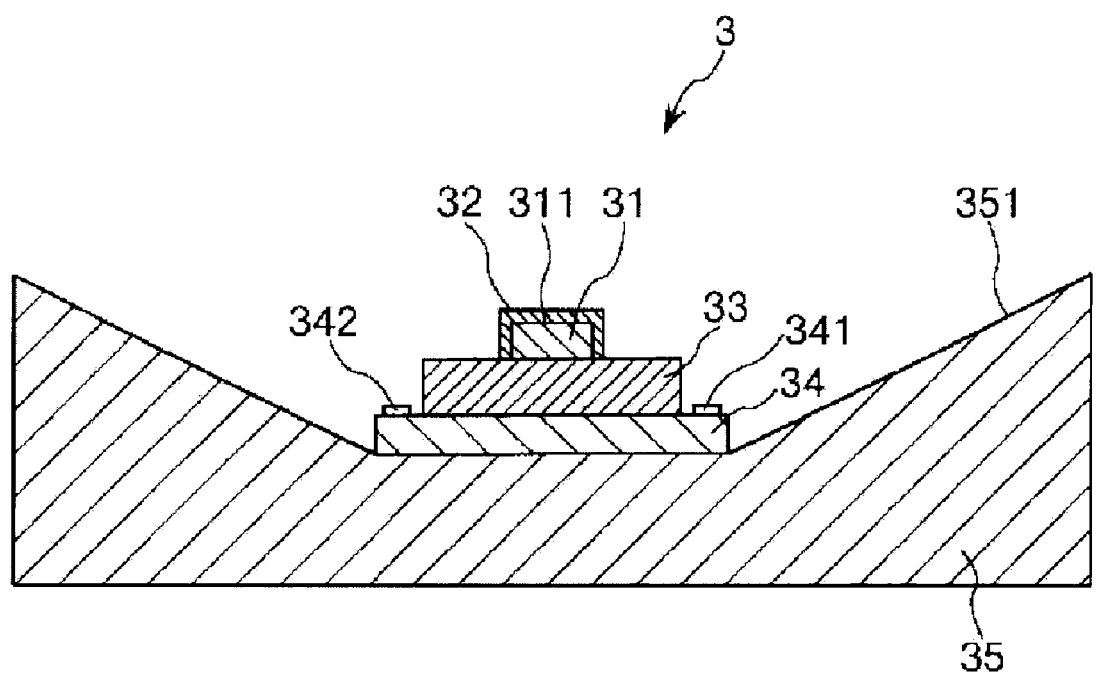
FIG. 4 is a cross-sectional view showing a schematic configuration of a light source device (a light emitting section) shown in FIG. 2.
Figure 5:
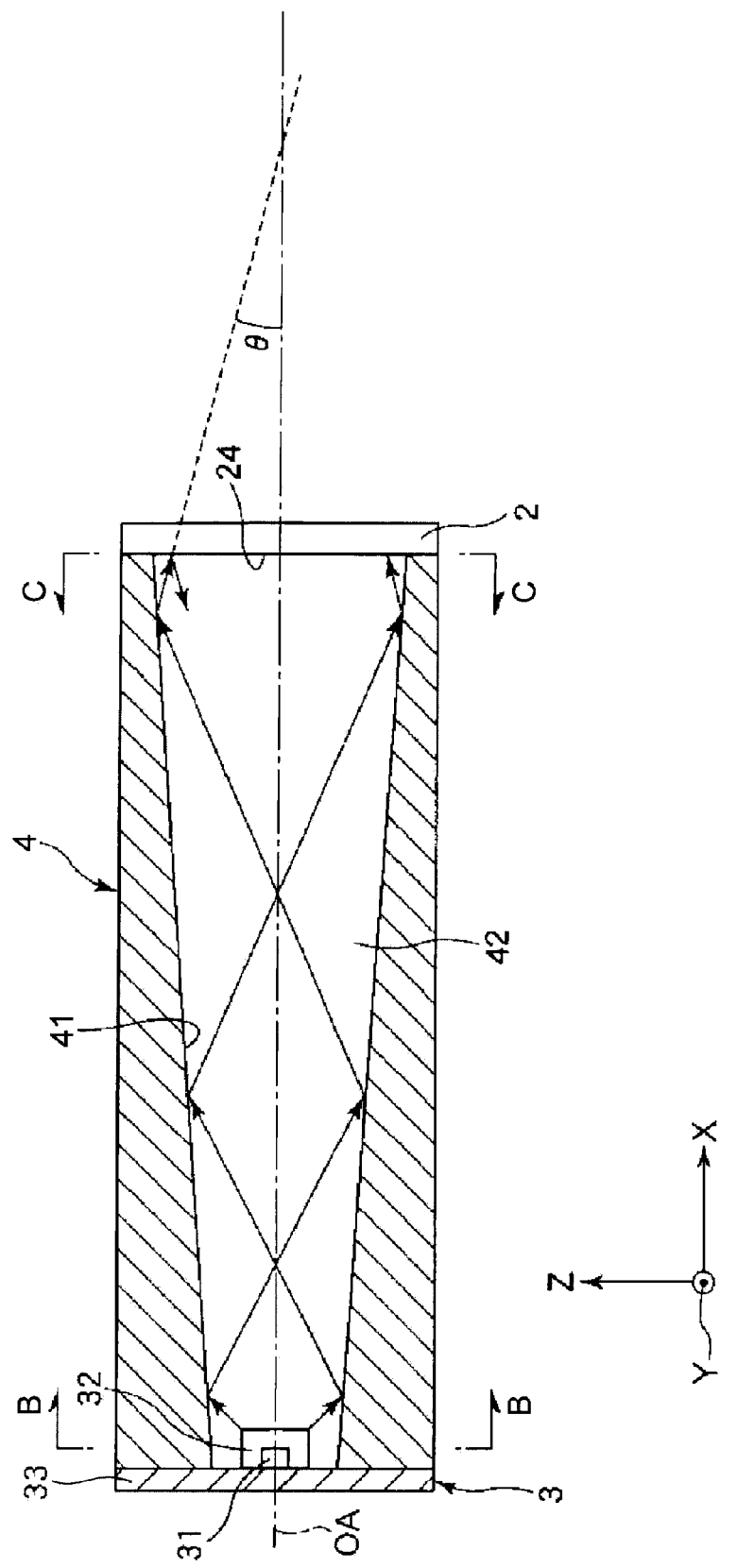
FIG. 5 is a vertical cross-sectional view for explaining a light guide member (a light guide section) shown in FIG. 2.
Figure 6A:
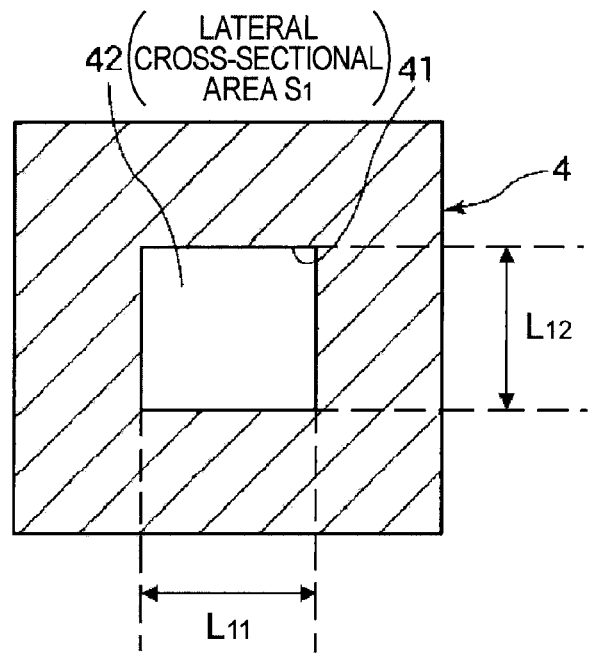
FIG. 6A is a cross-sectional view along the line B-B in FIG. 5.
Figure 6B:
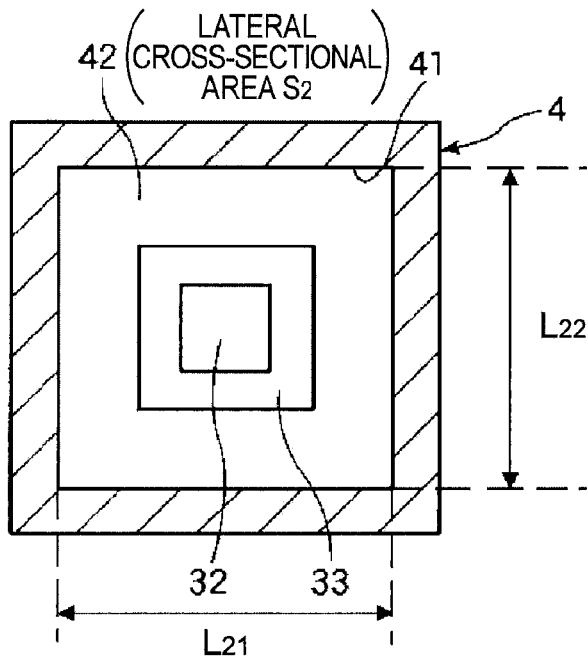
FIG. 6B is a cross-sectional view along the line C-C in FIG. 5.
Figure 7:
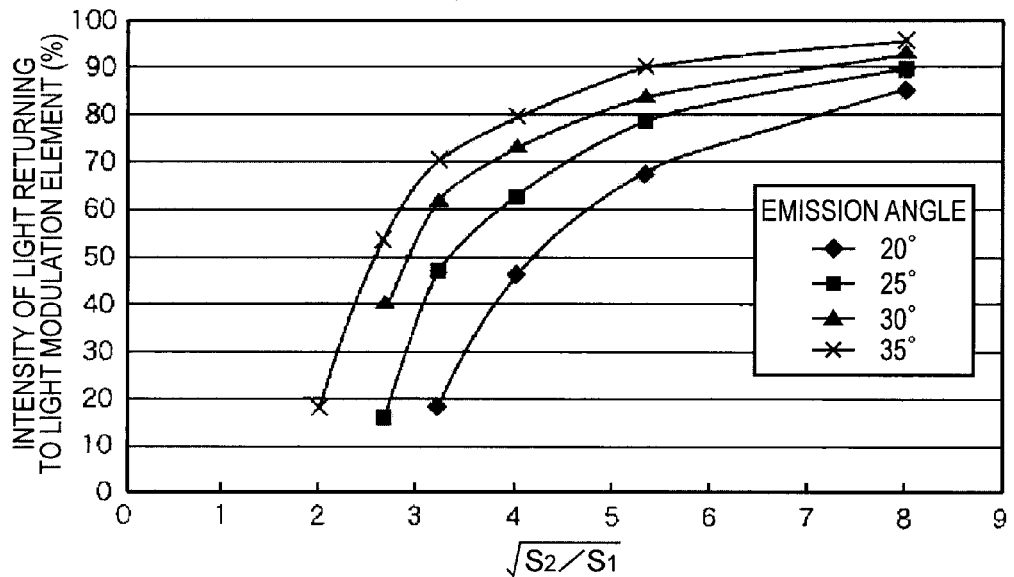
FIG. 7 is a graph showing a relationship between $\sqrt{(S_2/S_1)}$ of the light guide member (the light guide section) and the intensity of the light returning to the light modulation element (the light modulation section) side when a plurality of light beams with emission angles (directionalities) different from each other is respectively input from the light modulation element side of the light guide member.
Figure 8:
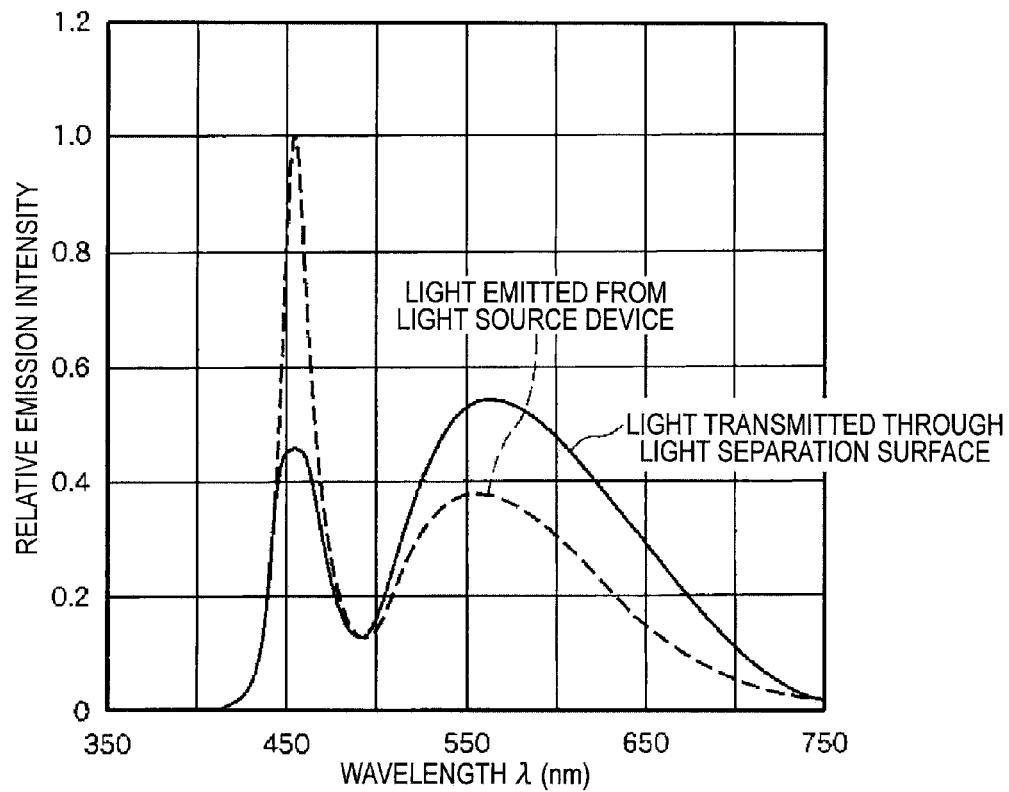
FIG. 8 is a graph showing a relationship between the wavelength and the intensity of each of the emitted light of the lone light source device (the lone light emitting section) and the transmitted light from the light separation surface.

FIG. 1 is a perspective view showing a schematic configuration of a display device according to a first embodiment of the invention, FIG. 2 is a vertical cross-sectional view (a cross-sectional view along the line A-A in FIG. 1) of the display apparatus shown in FIG. 1, FIG. 3 is a cross-sectional view showing a schematic configuration of a light modulation device (a light modulation section and a light separation section) shown in FIG. 2, FIG. 4 is a cross-sectional view showing a schematic configuration of a light source device (a light emitting section) shown in FIG. 2, FIG. 5 is a vertical cross-sectional view for explaining a light guide member (a light guide section) shown in FIG. 2, FIGS. 6A and 6B are lateral cross-sectional views of the light guide member shown in FIG. 5 (FIG. 6A is a cross-sectional view along the line B-B in FIG. 5, and FIG. 6B is a cross-sectional view along the line C-C in FIG. 5), FIG. 7 is a graph showing a relationship between $\sqrt{(S_2/S_1)}$ of the light guide member (the light guide section) and the intensity of the light returning to the light modulation element (the light modulation section) side when a plurality of light beams with emission angles (directionalities) different from each other is respectively input from the light modulation element side of the light guide member, and FIG. 8 is a graph showing a relationship between the wavelength and the intensity of each of the emitted light of the lone light source device (the lone light emitting section) and the transmitted light from the light separation surface. It should be noted that FIGS. 2 and 5 each show the members with dimensions exaggerated for the sake of convenience of explanation. Further, in the explanations below three directions orthogonal to each other are defined as X direction, Y direction, and Z direction, respectively.

The display apparatus 1 shown in FIG. 1 is for projecting image light on a screen S to display an image. As shown in FIGS. 1 and 2, the display apparatus 1 described above has a light modulation device 2 having a light modulation (spatial modulation) function, a light source device (a light emitting section) 3 for emitting light to the light modulation device 2, a light guide member (a light guide section) 4 for guiding the light from the light source device 3 to the light modulation device 2, and a projection lens 5 for projecting the light (the image light) modulated by the light modulation device 2 on the screen S.

Hereinafter, each part constituting the display apparatus 1 will sequentially be explained.

Light Modulation Device

The light modulation device 2 has a function of performing two-dimensional intensity modulation on the light L thus emitted. As shown in FIG. 3 the light modulation device 2 described above has a color filter (a light separation section) 21, a liquid crystal panel (the light modulation section) 22 bonded to the color filter 21, and polarization layers (the light separation section) 23, 24 disposed so as to sandwich these elements.

The color filter 21 has a substrate 211, a plurality of wavelength selecting sections 212, and a light blocking layer 213 disposed between the substrate 211 and the plurality of wavelength selecting sections 212.

The substrate 211 is a transparent substrate, and is formed of, for example, various kinds of glass or fused quartz.

On the lower surface of the substrate 211 in FIG. 3, there is bonded the plurality of wavelength selecting sections 212 via the light blocking layer 213.

The plurality of wavelength selecting sections 212 is arranged so as to form stripes. Further, a plurality of pixels (sub-pixels) is arranged along the longitudinal direction of each of the wavelength selecting sections 212. It should be noted that the plurality of wavelength selecting sections 212 can be arranged in a matrix.

In the present embodiment, the plurality of wavelength selecting sections 212 is composed of a plurality of wavelength selecting sections 212R for converting the incident light into red light, a plurality of wavelength selecting sections 212G for converting the incident light into green light, and a plurality of wavelength selecting sections 212B for converting the incident light into blue light. Thus, full-color images can be displayed.

In the case in which the plurality of wavelength selecting sections 212 is composed of the plurality of wavelength selecting sections 212R, 212G, and 212B different from each other as described above, namely in the case in which the display apparatus 1 has a configuration capable of displaying full-color images, the aperture ratio of the liquid crystal panel 22 becomes extremely low. Therefore, the advantage obtained by applying the embodiment of the invention using the light guide member 4 described later becomes prominent.

Further, it is preferable that at least one of the plurality of wavelength selecting sections 212 has a property of reflecting the light in a non-transmissive wavelength band (a wavelength band other than the wavelength band to be the object of the color conversion described above or a part thereof). Thus, the light not passing through the wavelength selecting section 212 of the color filter 21 can be used efficiently. In this case, it is sufficient to provide, for example, at least one of the plurality of wavelength selecting sections 212 with an element using a dielectric multilayer film or an autocloned photonic crystal configured so as to transmit the light in the wavelength band to be the object of the color conversion, and to reflect the light in the other wavelength band.

The light blocking layer 213 is provided with a plurality of translucent sections 214 corresponding respectively to the plurality of wavelength selecting sections 212 described above and a plurality of pixel electrodes (individual electrodes) 223 described later. Thus, it is possible to input the light to the respective wavelength selecting sections 212 via the respective translucent sections 214.

In the present embodiment, each of the translucent sections 214 is filled with a transparent material such as a resin material, a glass material, or a metal material each having translucency.

Further, the light blocking layer 213 is disposed in accordance also with switching elements 229 and the wiring thereof described later, and has a function of preventing the light from being emitted to the switching elements 229 and the wiring thereof. Thus, it is possible to prevent a failure such as light leakage of the switching element 229 from occurring.

In particular, the light blocking layer 213 is disposed in the vicinity of the light source 31 of the liquid crystal panel 22 and in parallel to a lateral cross-sectional surface of a tubular reflecting surface 41, and the surface on the substrate 211 side is provided with light reflectivity. Thus, the light blocking layer 213 reflects (feeds back) the light from the light guide member 4 to the light guide member 4 side, and transmits the light from the light guide member 4 via the portions (the translucent sections 214) not provided with the light blocking layer 213. In other words, the surfaces of the light blocking layer 213 and the translucent sections 214 on the side of the substrate 211 form the light separation surface having a function of separating the light from the light guide member 4 into the transmitted light transmitted toward the liquid crystal panel 22 side and the reflected light reflected toward the light guide member 4.

Since the light blocking layer 213 have the light reflectivity described above, it is possible to guide the light to be blocked by the light blocking layer 213 to the light guide member 4 to thereby use the light efficiently.

As a constituent material of the light blocking layer 213 described above, there is no particular limitation thereto providing the surface of the light blocking layer 213 on the substrate 211 side has light reflectivity and the light blocking property, and metal such as silver, aluminum, or an aluminum alloy, or a dielectric multilayer film (an optical multilayer film) can be used therefor. Further, it is possible to form the entire light blocking layer 213 from metal, or it is also possible to form only the part of the light blocking layer 213 in the vicinity of the surface on the substrate 211 side from metal or a dielectric multilayer film.

Further, although it is sufficient that the light blocking layer 213 is for reflecting at least one of the light (excitation light) from the light source 31 described later and fluorescence from a fluorescent substance 32, it is preferable that the light blocking layer 213 has a peak of the reflectivity in the vicinity of at least one of the peak wavelength of the light (the excitation light) from the light source 31 described later and the peak wavelength of the fluorescence from the fluorescent substance 32.

On the surface of the color filter 21 on the light emission side thereof, there is disposed the liquid crystal panel 22.

The liquid crystal panel 22 is a transmissive light modulation element (the light modulation section) for changing the spatial distribution of the light input thereto in the polarization direction.

Such a liquid crystal panel 22 has a substrate 221, a liquid crystal layer 222 formed of a liquid crystal encapsulated between the substrate 221 and the color filter 21, a plurality of pixel electrodes 223 and a common electrode 224 for applying a voltage to the liquid crystal layer 222, and a pair of oriented films 225, 226 for orienting the liquid crystal of the liquid crystal layer 222.

The substrate 221 is a transparent substrate, and is formed of, for example, various kinds of glass.

The liquid crystal layer 222 includes liquid crystal molecules (not shown), and changes the orientation of the liquid crystal molecules, namely the liquid crystal, in accordance with the state of the voltage applied between the pixel electrode 223 and the common electrode 224.

Such a liquid crystal layer 222 is disposed between the pair of oriented films 225, 226 so as to have contact with the pair of oriented films 225, 226. Thus, it becomes possible to set the liquid crystal of the liquid crystal layer 222 at a predetermined timing to a predetermined orientation state.

On the opposite side of the oriented film 225 to the liquid crystal layer 222, there is disposed the plurality of pixel electrodes 223, and on the opposite side of the oriented film 226 to the liquid crystal layer 222, there is disposed the common electrode 224.

The pixel electrodes 223 and the common electrode 224 are each a transparent electrode, and is formed of, for example, indium tin oxide (ITO).

The plurality of pixel electrodes 223 is disposed correspondingly to the plurality of wavelength selecting sections 212 described above, and is arranged in a matrix.

Further, in the vicinity of each of the pixel electrodes 223 there is disposed a switching element 229 such as a TFT so as to correspond to the pixel electrode 223. It is possible to control the state of the voltage applied between each of the pixel electrodes 223 and the common electrode 224 using the corresponding switching element 229.

Further, although not shown in the drawings, between the pixel electrodes 223 there is disposed the wiring for applying electricity to each of the switching elements 229. The liquid crystal panel 22 is configured so that the switching elements 229 and the wiring (not shown) block the light while the other region is capable of transmitting the light, thus forming translucent window sections.

The polarization layer 23 is disposed on the opposite surface of the substrate 221 to the color filter 21, and the polarization layer 24 is disposed on the opposite surface of the substrate 211 to the liquid crystal panel 22.

The pair of polarization layers 23, 24 is each disposed in the vicinity of the liquid crystal panel 22 on the light source 31 side parallel to or substantially parallel to the lateral cross-sectional surface of the tubular reflecting surface 41, and has a function of transmitting only the polarized light having a specific direction and blocking the polarized light having a direction orthogonal to the specific direction.

In particular, the polarization layer 24 is configured so as to reflect the polarized light having the direction orthogonal to the specific direction described above. Thus, it becomes possible to efficiently use the light not transmitted through the polarization layer 24 by the action of the light guide member 4 described later. Here, the opposite surface of the polarization layer 24 to the substrate 211 forms the light separation surface having a function of separating the light from the light guide member 4 into the transmitted light transmitted toward the liquid crystal panel 22 side and the reflected light reflected toward the light guide member 4 side.

As the polarization layer 24 what is provided with the function described above can be adopted without any limitations, and a wire grid polarization splitting element composed of a plurality of thin wires disposed with fine intervals is used preferably.

It should be noted that it is also possible to use another polarization splitting element (e.g., a photonic lattice polarization element) instead of the polarization layer 24. Further, the polarization layer 24 can be configured by forming the wire grid polarization element or an organic polarization element on another transparent substrate than the substrate 211.

Further, it is preferable that a retardation plate for controlling the state of the polarization is disposed between the polarization layer (the polarization splitting element) 24 and the light source device 3. Thus, it becomes possible to shift the phase of the light not transmitted through the polarization layer 24 to thereby increase the ratio of the light transmitted through the polarization layer 24 when the light returns from the light guide member 4, thus using the light efficiently.

Further, the light modulation device 2 is disposed so that an image display area (an area "a" shown in FIG. 1) thereof is included in (covered by) an inside area of the opposite end (the end opposite to the light source device 3) of the tubular reflecting surface 41 as described later, and on the opposite side (entrance side of the light) of the polarization layer 24 to the color filter 21, there is disposed a reflecting section 25 corresponding to an image nondisplay area (an area "b" shown in FIG. 1) formed on the periphery of the image display area as shown in FIG. 3.

The reflecting section (reflecting film) 25 has light reflectivity on the opposite surface thereof to the color filter 21.

Thus, the reflecting section 25 reflects (returns) the light from the light guide member 4 toward the light guide member 4 side.

Such a reflecting section 25 is capable of guiding the light applied to the image nondisplay area (i.e., the area having no contribution to display of images, and requiring no illumination) to the light guide member 4 described later, thereby using the light efficiently.

Further, the length (the length of each side parallel to the Y direction) of the image display area "a" in the Y direction is not particularly limited, but is preferably in a range of 5 through 20 mm. Further, the length (the length of each side parallel to the Z direction) $L_{22}$ of the image display area "a" in the Z direction is not particularly limited, but is preferably in a range of 4 through 18 mm.

Such a reflecting section 25 can be configured in the same manner as in the case of the light blocking layer 213 described above. Specifically, although not particularly limited, as the constituent material of the reflecting section 25, metal such as silver, aluminum, or an aluminum alloy, or a dielectric multilayer film (an optical multilayer film) or the like can be used. Further, it is possible to form the entire reflecting section 25 from metal, or it is also possible to form only the part of the reflecting section 25 in the vicinity of the opposite surface of the reflecting section 25 to the color filter 21 from metal or a dielectric multilayer film.

Further, although it is sufficient that the reflecting section 25 is for reflecting at least one of the light (excitation light) from the light source 31 described later and fluorescence from a fluorescent substance 32, it is preferable that the reflecting section 25 has a peak of the reflectivity in the vicinity of at least one of the peak wavelength of the light (the excitation light) from the light source 31 described later and the peak wavelength of the fluorescence from the fluorescent substance 32.

It should be noted that in the area (i.e., the image nondisplay area) provided with the reflecting section 25 described above, the light blocking layer 213 and the polarization layer 24 described above can be eliminated. Further, the reflecting section 25 can be eliminated. In this case, it is preferable to dispose the light blocking layer 213 and the polarization layer 24 so as to cover the image nondisplay area.

Light Source Device

As shown in FIG. 4, the light source device (the light emitting section) 3 has a light source 31, a fluorescent substance 32 disposed so as to cover the light emission side of the light source 31, a support base 33 for supporting the light source 31, a circuit board 34 for driving the light source 31, and a pedestal member 35 for fixing these members to the light guide member 4 described later.

The light source 31 has a function of exiting the fluorescent substance 32.

The light source 31 described above has a light emitting part (an apical surface) 311 for emitting the light (i.e., the excitation light) for exciting the fluorescent substance 32. In the present embodiment, the light source 31 is for emitting blue light, blue-violet light, or ultraviolet light as the excitation light for exciting the fluorescent substance 32.

Although not particularly limited, as the light source 31 described above, a light emitting diode (LED), a laser diode (LD), and so on can preferably be used. It should be noted that although in the present embodiment, there is used a single light source 31, it is also possible to use two or more light sources 31, and in such a case, it is also possible that the two or more light sources emit excitation light with the wavelength different from each other, or it is also possible that at least one (the whole or a part thereof) of the light sources is not covered by the fluorescent substance, or further, it is also possible that the types of the fluorescent substances of the two or more light sources are different from each other.

The light source 31 described above is bonded on the support base 33 by a method such as flip chip bonding. The support base 33 is made of a resin material or a ceramic material, and is mounted on the circuit board 34. Further, the support base 33 is provided with the wiring (not shown) for obtaining electrical conduction between the light source 31 and the circuit board 34. The wiring described above is electrically connected to the circuit board 34 using a brazing method or the like.

The circuit board 34 has wiring connecting terminals 341, 342 for supplying electrical current, and it is arranged that electrical power can be supplied from the circuit board 34 to the light source 31 via the wiring of the support base 33 by supplying electricity to the wiring connecting terminals 341, 342.

The circuit board 34 described above is fixed to the pedestal member 35.

The pedestal member 35 has a substantially plate-like shape, and is fixed to and mounted on the end of the light guide member 4 described later on the light entrance side thereof.

The pedestal member 35 described above has light reflectivity in the surface on the light source 31 side thereof. Thus, it becomes possible to reflect the direct light from the light source 31 and the light, which is fed back from the liquid crystal panel 22 side by the light guide member 4 described later, toward the liquid crystal panel 22. As a result, it becomes possible to enhance the light use efficiently to thereby improve the brightness of the image.

In particular in the present embodiment, a surface 351 of the pedestal member 35 on the light source 31 side forms a tilted surface so as to open more widely toward the light source 31 side. Thus, it becomes possible to more efficiently reflect the direct light from the light source 31 toward the liquid crystal panel 22 side.

The fluorescent substance 32 is for emitting fluorescence when being excited by the light (the excitation light) from the light source 31 described above.

In the present embodiment, the fluorescent substance 32 is configured to emit the fluorescence with a color with which the light emitted from the light source device 3 becomes white light. Specifically, the light source device 3 is configured so that the light (the excitation light) from the light source 31, and the fluorescent generated by exciting the fluorescent substance 32 not only with the light immediately after the emission from the light source 31 but also with the light (the reflected light) fed back from the light blocking layer 213 are combined, thus the light applied to the liquid crystal panel 22 becomes white light. More specifically, as the fluorescent substance 32, there is used a substance for emitting fluorescence with a color with which the color temperature of the light emitted by the lone light source device 3 becomes equal to or higher than 6500 K. Thus, as a result of using the light reflected by the light blocking layer 213 for exciting the fluorescent substance 32, it is possible to achieve balance between the excitation light and the fluorescence to thereby keep a preferable color balance. As a result, it becomes possible to easily realize full-color images by the combination with the color filter 21 described above.

For example, in the case of using a light source of blue light as the light source 31, the fluorescence from the fluorescent substance 32 has a wavelength component from green to red with a peak of approximately yellow wavelength. Further, in the case of using a light source of blue-violet light or ultraviolet light as the light source 31, the fluorescence from the fluorescent substance 32 has a wavelength component in a broad range of blue through red.

Although not particularly limited, as the constituent material of the fluorescent substance 32 described above, various fluorescent material can be used providing the fluorescent material emits the fluorescence described above.

More specifically, as the fluorescent material emitting green light, there can be cited, for example, 9,10-bis[(9-ethyl-3-carbazole)-vinylenyl]-anthracene, poly(9,9-dihexyl-2,7-vinylenefluorenylene), poly[(9,9-dioctylfluorene-2,7-diyl)-co-(1,4-diphenylene-vinylene-2-methoxy-5-{2-ethylhexyloxy}benzene)], and poly[(9,9-dioctyl-2,7-divinylenefluorenylene)-alt-co-(2-methoxy-5-(2-ethoxylhexyloxy)-1,4-phenylene)], as the fluorescent material emitting red light, there can be cited, for example, tris(1-phenylisoquinoline) iridium (III), poly[2,5-bis(3,7-dimethyloctyloxy)-1,4-phenylenevinylene], poly[2-methoxy-5-(2'-ethylhexyloxy)-1,4-(1-cyanovinylene)phenylene], and poly[2-methoxy-5-(3,7-dimethyloctyloxy)-1,4-phenylenevinylene], as the fluorescent material emitting blue light, there can be cited, for example, 4,4'-bis(9-ethyl-3-carbazovinylene)-1,1'-biphenyl, poly[(9,9-dioctylfluorene-2,7-diyl)-co-(2,5-dimethoxybenzene-1,4-diyl)], poly[(9,9-dihexyloxyfluorene-2,7-diyl)-alt-co-(2-methoxy-5-{2-ethoxyhexyloxy}phenylene-1,4-diyl)], and poly[(9,9-dioctylfluorene-2,7-diyl)-co-(ethylnylbenzene)], and as the yellow fluorescent material, there can be cited, for example, a compound obtained by substituting arbitrary number (preferably 2 through 6) of aryl radicals (preferably phenyl radicals) at arbitrary positions in naphthacene, and mono-indenoperylene derivatives, and it is also possible to use either one of these compounds alone or two or more of these compounds in combination.

Further, the fluorescent substance 32 can be formed with relative ease using various deposition methods or coating methods.

Further, the thickness of the fluorescent substance 32 is different between the types of the light source 31 and the tilt angle θ of the tubular reflecting surface 41 described later, and is not particularly limited providing the fluorescent substance 32 can emit the fluorescence described above, but is preferably in a range of about 10 through 300 μm.

Further, the length of the fluorescent substance 32 in each of the Y direction and the Z direction is not particularly limited, but is preferably in a range of 1 through 5 mm.

It should be noted that the fluorescent substance 32 can have contact with the light emitting part 311, or can be separated from the light emitting part 311.

Light Guide Member

The light guide member (the light guide section) 4 is provided with the tubular reflecting surface 41 as shown in FIGS. 1 and 2. On one end of the tubular reflecting surface 41, there is disposed the light source device 3 (the light source 31), and on the other end thereof, there is disposed the light modulation device 2 (the liquid crystal panel 22). More specifically, the other end (the opposite end to the light source device 3) of the tubular reflecting surface 41 is opposed to the light modulation device 2 so as to include the image display area (the area "a" shown in FIG. 1) of the light modulation device 2.

The tubular reflecting surface 41 described above has a function of guiding the light from the light source 31 to the liquid crystal panel 22. In other words, inside the tubular reflecting surface 41, there is formed a light guide space for guiding the light. The light guide space is formed so as to be substantially symmetrical with respect to the optical axis OA.

In the present embodiments, the light guide member 4 has an exterior shape of a quadrangular prism, and is provided with a hollow section (an inside area) 42 penetrating along the axis line (the optical axis OA). Further, the inside surface of the light guide member 4 forms the tubular reflecting surface 41 having light reflectivity.

Further, the hollow section 42 has a lateral cross-sectional surface (the cross-sectional surface perpendicular to the optical axis OA) forming a square shape. In other words, the lateral cross-sectional surface of the reflecting surface 41 forms a square shape.

Here, the optical axis OA of the tubular reflecting surface 41 is parallel to the X direction, the lateral cross-sectional surface of the tubular reflecting surface 41 has a pair of sides parallel to the Y direction (a first direction) and the other pair of sides parallel to the Z direction (a second direction).

It should be noted that the shape of the lateral cross-sectional surface of the reflecting surface 41 is not limited to a square shape, but can also be, for example, a rectangular shape or a circular shape. Further, the lateral cross-sectional shape can be the same as (similar to) or different from each other between one end and the other end of the tubular reflecting surface 41.

Further, it is preferable that the ratio $L_{11}/L_{12}$ between the Y-directional length $L_{11}$ of the lateral cross-sectional surface of the inside area of the tubular reflecting surface 41 at the end thereof on the light source 31 side and the Z-directional length $L_{12}$ of the same is in a range of ¼ through 4.

Further, it is preferable that the ratio $L_{21}/L_{22}$ between the Y-directional length $L_{21}$ of the lateral cross-sectional surface of the inside area of the tubular reflecting surface 41 at the end thereof on the polarization layer 24 (the light separation surface) side and the Z-directional length $L_{22}$ of the same is in a range of ¼ through 4.

Thus, it becomes possible to guide the light evenly from the light source 31 to the polarization layer 24 (the light separation surface) via the light guide member 4, and at the same time, to guide the reflected light reflected by the polarization layer 24 to the polarization layer 24 while reflecting it by the tubular reflecting surface 41.

In contrast, if the ratio $L_{11}/L_{12}$ and the ratio $L_{21}/L_{22}$ are smaller than the respective lower limit values described above, the luminance in both of the Y-directional ends of an image displayed on the screen S becomes lower than that in the central portion of the same, which might cause uneven shading in the image, depending on the size and the shape of the light source 31 described above and the size and the shape of the image display area "a." On the other hand, if the ratio $L_{11}/L_{12}$ and the ratio $L_{21}/L_{22}$ exceed the respective upper limit values described above, the luminance in both of the Z-directional ends of an image displayed on the screen S becomes lower than that in the central portion of the same, which might cause uneven shading in the image, depending on the size and the shape of the light source 31 described above and the size and the shape of the image display area "a."

Further, the Y-directional length (the length of each side parallel to the Y direction) $L_{11}$ of the lateral cross-sectional surface (the lateral cross-sectional surface defining a lateral cross-sectional area $S_1$ described later) of the inside area of the tubular reflecting surface 41 at the end thereof on the light source 31 side is not particularly limited, but is preferably in a range of 1 through 10 mm. Further, the Z-directional length (the length of each side parallel to the Z direction) $L_{12}$ of the lateral cross-sectional surface of the inside area of the tubular reflecting surface 41 at the end thereof on the light source 31 side is not particularly limited, but is preferably in a range of 1 through 10 mm.

Further, the Y-directional length (the length of each side parallel to the Y direction) $L_{21}$ of the lateral cross-sectional surface (the lateral cross-sectional surface defining a lateral cross-sectional area $S_2$ described later) of the inside area of the tubular reflecting surface 41 at the end thereof on the polarization layer 24 (the light separation surface) side is not particularly limited, but is preferably in a range of 5 through 20 mm. Further, the Z-directional length (the length of each side parallel to the Z direction) $L_{22}$ of the lateral cross-sectional surface of the inside area of the tubular reflecting surface 41 at the end thereof on the polarization layer 24 (the light separation surface) side is not particularly limited, but is preferably in a range of 4 through 18 mm.

Further, as shown in FIGS. 2 and 5, the hollow section 42 narrows toward the light source device 3 side from the side of the light modulation device 2. In other words, the tubular reflecting surface 41 becomes narrower toward the light source device (the light emitting section) 3 side from the side of the liquid crystal panel 22 (the light modulation section). In other words, the tubular reflecting surface 41 becomes wider toward the liquid crystal panel 22 from the side of the light source device 3.

Further, the light source device 3 described above is disposed so as to cover one end of the inside area of the tubular reflecting surface 41, and at the same time, the liquid crystal panel (the light modulation section) 22 is disposed so as to cover the other end of the inside area of the tubular reflecting surface 41. Further, the area surrounded by the tubular reflecting surface 41, the light source device 3, and the liquid crystal panel 22 forms a closed area including the light source 31. Thus, since undesirable leakage of the light from the inside area of the tubular reflecting surface 41 to the outside can be prevented, and the light reflected by the light blocking layer 213 (the reflecting section) described above is easily and surely used, it becomes possible to display high-intensity and high-quality images.

The tubular reflecting surface 41 described above inputs the light, emitted from the light source device 3, from the one end thereof, and then outputs it to the other end thereof. On that occasion, the tubular reflecting surface 41 reflects the light with a relatively large angle with respect to the optical axis OA among the light from the light source device 3 one or more times. Further, since the tubular reflecting surface 41 (a light guide space) opens wider toward the light modulation device 2 side from the light source device 3 side as described above, the light having a relatively large angle with the optical axis OA is converted into the light having a relatively small angle with the optical axis OA. Thus, even in the case in which the light from the light source device 3 diffuses widely with respect to the optical axis OA, it becomes possible to apply the light with relatively small diffusion along the optical axis OA to the light modulation device 2.

In particular, the light guide member 4 is configured as described below so that the tubular reflecting surface 41 guides the light (hereinafter also referred to as "light reflected by the light modulation device 2"), which is reflected by the polarization layer 24 (the light separation surface) described above and the light blocking layer 213 (the light separation surface) toward the light guide member 4 side, to the translucent sections 214 (the translucent window sections).

Specifically, denoting the lateral cross-sectional area of the inside area of the tubular reflecting surface 41 at the end thereof on the light source 31 side as $S_1$, the lateral cross-sectional area of the tubular reflecting surface 41 at the end thereof on the polarization layer 24 side or the light blocking layer 213 side (the light separation surface side) as $S_2$, and the maximum incident angle at which the light from the light source 31 reflected by the tubular reflecting surface 41 is input to the polarization layer 24 or the light blocking layer 213 as $\theta[°]$, the light guide member 4 is configured so that $\theta \times \sqrt{(S_2/S_1)}$ becomes equal to or greater than 110.

In more specific explanation, in the present embodiment, denoting the lateral cross-sectional area of the inside area of the tubular reflecting surface 41, and including the apical surface of the light source 31 as $S_1$ as shown in FIG. 6A, the lateral cross-sectional area (the lateral cross-sectional area of the inside area of the tubular reflecting surface 41 and including the polarization layer 24 (the light separation surface)) of the inside area of the tubular reflecting surface 41 at the end on the side near to the polarization layer 24 (the light separation surface) as $S_2$ as shown in FIG. 6B, and the maximum incident angle at which the light from the light source 31 reflected by the tubular reflecting surface 41 is input to the polarization layer 24 (the light separation surface) as $\theta[°]$ as shown in FIG. 5, the light guide member 4 is configured so that $\theta \times \sqrt{(S_2/S_1)}$ becomes equal to or greater than 110.

When inputting a plurality of light beams with emitting angles (directivities) different from each other from the output side (the side of the liquid crystal panel 22) of the light guide member 4, as shown in FIG. 7, there is shown the tendency that the intensity of the light returning to the side of the liquid crystal panel 22 increases as $\sqrt{(S_2/S_1)}$ of the light guide member 4 increases. Further, there is shown the tendency that the larger the emission angle (directivity angle) of the light input to the light guide member 4 is, and the smaller $\sqrt{(S_2/S_1)}$ of the light guide member 4 becomes, the more the intensity of the light returning to the side of the liquid crystal panel 22 increases.

The inventors of the invention have obtained the knowledge described above as a result of keen examination, and found out the fact that by setting $\theta \times \sqrt{(S_2/S_1)}$ to be equal to or larger than 110, most part (specifically approximately 70% or more) of the light reflected by the light modulation device 2 is guided to the side of the liquid crystal panel 22.

In the manner described above, in the display apparatus 1, the most part (specifically approximately 70% or more) of the light reflected by the light modulation device 2 can be guided to the side of the liquid crystal panel 22. As a result, it becomes possible to increase the intensity of the light (namely the intensity of the light transmitted through the liquid crystal panel 22) to the translucent sections 214.

Since the light reflected by the light modulation device 2 is thus used efficiently, it becomes possible to display high-intensity and high-quality images while achieving reduction of the power consumption.

Further, the light (remaining portion) other (approximately 30%) than the light guided to the liquid crystal panel 22 among the light reflected by the light modulation device 2 is guided by the tubular reflecting surface 41 to the light source 31 of the light source device 3.

As described above, in the light source device 3 using the light source 31 and the fluorescent substance 32, the light of the remaining portion described above can efficiently be used for excitation of the fluorescent substance 32 disposed in the vicinity of the light source 31. As a result, the luminance of the image can be improved.

Further, in the case in which, for example, the light source of the blue light is used as the light source 31, and the fluorescent substance for emitting the fluorescence having the wavelength component of green through red with the peak at approximately yellow wavelength is used as the fluorescent substance 32, the intensity of the blue light among the light transmitted through the polarization layer 24 becomes lower than the intensity of the blue light among the emitted light of the lone light source device 3 as shown in FIG. 8. Further, the intensity of the wavelength component of green through red among the light transmitted through the polarization layer 24 becomes higher than the intensity of the wavelength component of green through red among the emitted light of the lone light source device 3. As a result of the above, homogenization of the balance of the intensity of the wavelength component of blue through red is achieved, thus the light transmitted through the polarization layer 24 can be made as preferable white light.

It should be noted that regarding the lateral cross-sectional area $S_1$, although the lateral cross-sectional area of the inside area of the tubular reflecting surface 41 including the apical surface of the light source 31 is adopted in the present embodiment as "$S_1$," because the apical surface of the light source 31 is located inner than the end of the tubular reflecting surface 41, in the case in which the apical surface of the light source 31 is located outer than the end of the tubular reflecting surface 41, the lateral cross-sectional area of the inside area of the tubular reflecting surface 41 at the end thereof on the side near to the light source 31 is adopted as "$S_1$."

Further, regarding the lateral cross-sectional area $S_2$, in the case in which the polarization layer 24 (the light separation surface) is located outer than the end of the tubular reflecting surface 41, the lateral cross-sectional area of the inside area of the tubular reflecting surface 41 at the end thereof on the side near to the polarization layer 24 (the light separation surface) is adopted as "$S_2$," and in the case in which the polarization layer 24 (the light separation surface) is located inner than the end of the tubular reflecting surface 41, the lateral cross-sectional area of the inside area of the tubular reflecting surface 41 including the polarization layer 24 (the light separation surface) is adopted as "$S_2$." In the present embodiment, since the polarization layer 24 (the light separation surface) and the end (end surface) of the tubular reflecting surface 41 are identical to each other, the lateral cross-sectional area of the inside area of the tubular reflecting surface 41 at the end thereof on the side near to the polarization layer 24 (the light separation surface) and the lateral cross-sectional area of the inside area of the tubular reflecting surface 41 including the polarization layer 24 (the light separation surface) are equal to each other.

Further, in the case in which a plurality of light separation surfaces exists in the optical axis OA direction (the X direction) when defining the lateral cross-sectional area S1 and the lateral cross-sectional area S2, although it is possible to use arbitrary one of the plurality of light separation surfaces as the reference, or to use specific one of the plurality of light separation surfaces as the reference, it is preferable to use one with the highest light reflecting performance among the plurality of light separation surfaces as the reference. In the present embodiment, the light separation surface (the polarization layer 24) nearest to the light source 31 among the plurality of light separation surfaces is used as the reference. Thus, the advantage of improving the light use efficiency described above can notably be obtained.

Further, the maximum incident angle θ denotes the incident angle of the light beam with the largest incident angle out of the incident light beams corresponding to the light emitted from the light source device 3, and entering the polarization layer 24 (the light separation surface) via the light guide member 4. Further, the maximum incident angle θ is equal to the emission angle (the maximum emission angle) of the light reflected on the polarization layer 24 (light separation surface).

Further, the maximum incident angle θ varies in accordance with the directivity of the emitted light from the light source device 3, the tilt angle of the tubular reflecting surface 41 with respect to the optical axis OA, the length of the tubular reflecting surface 41 in the optical axis OA direction, and so on.

The maximum incident angle θ can be measured by introducing the light from the light source device 3 into the inside of the tubular reflecting surface 41 of the light guide member 4 in the condition of eliminating the light modulation device 2, measuring the length of the light emitted from the light source device 3 in one direction perpendicular to the optical axis OA at a first position corresponding to the light separation surface and a second position (the vicinity of the light separation surface) distant a minute distance from the position corresponding to the light separation surface toward the opposite side to the light source device 3, and using an expression $\tan θ ≈ \Delta r/\Delta x$ defining the length half of the difference between the two lengths thus measured as $\Delta r$, and the distance between the first position and the second position as $\Delta x$.

Further, the tilt angle of the reflecting surface 41 with respect to the axis line (the optical axis OA) can be constant in the axis line direction of the tubular reflecting surface 41, or can be locally different.

The reflecting surface 41 described above is not particularly limited providing the function described above can be exerted, but can be made of metal such as silver, aluminum, or an aluminum alloy, or a dielectric multilayer film (an optical multilayer film) in the similar manner as in the light blocking layer (reflecting section) 213.

The projection lens 5 is a projection optical system composed of a group of lenses not shown, and has a function of enlarging the image light processed by the light modulation device 2 with a predetermined enlargement factor. Thus, an image with a desired size can be projected and displayed on the screen S.

According to the display apparatus 1 explained hereinabove, since $θ×\sqrt{(S_2/S_1)}$ is equal to or greater than 110, even in the case in which the luminance of the light source 31 is relatively low, the intensity of the light transmitted through the liquid crystal panel 22 out of the light emitted from the light source device 3 can be increased. Thus, the light reflected by the polarization layer 24 (the light separation surface) toward the light guide member 4 is thus used efficiently, it becomes possible to display high-intensity and high-quality images while achieving reduction of the power consumption.

Second Embodiment

A second embodiment of the invention will hereinafter be described.

Figure 9:
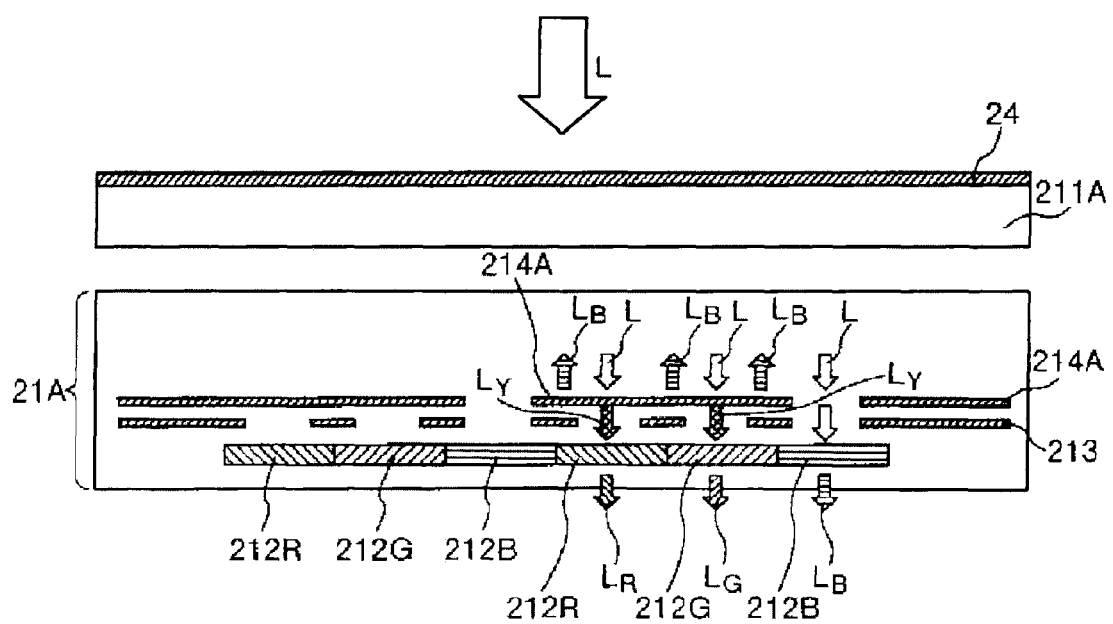
FIG. 9 is a schematic cross-sectional view for explaining the light modulation device provided to the display apparatus according to a second embodiment of the invention.
Figure 10A:
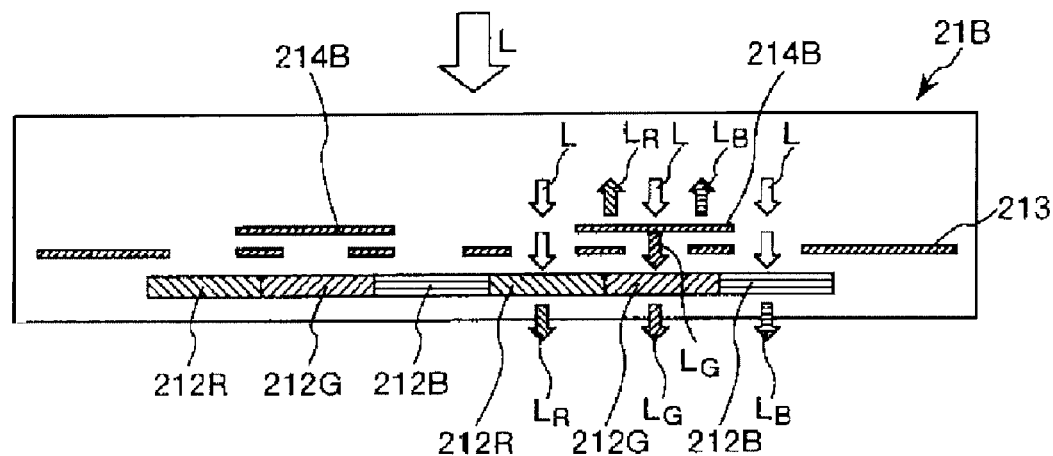
FIGS. 10A through 10C are schematic cross-sectional views for explaining modified examples of the light modulation device provided to the display apparatus according to the second embodiment of the invention.
Figure 10B:
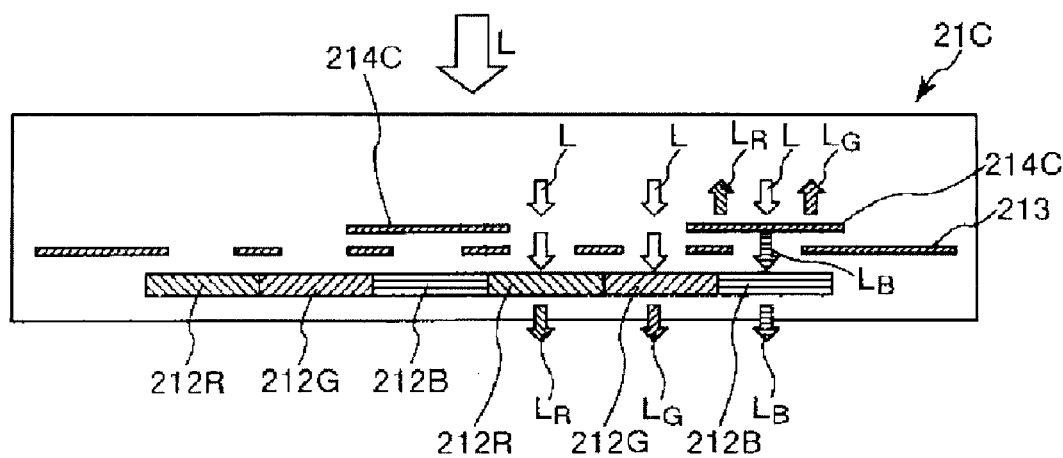
Figure 10C:
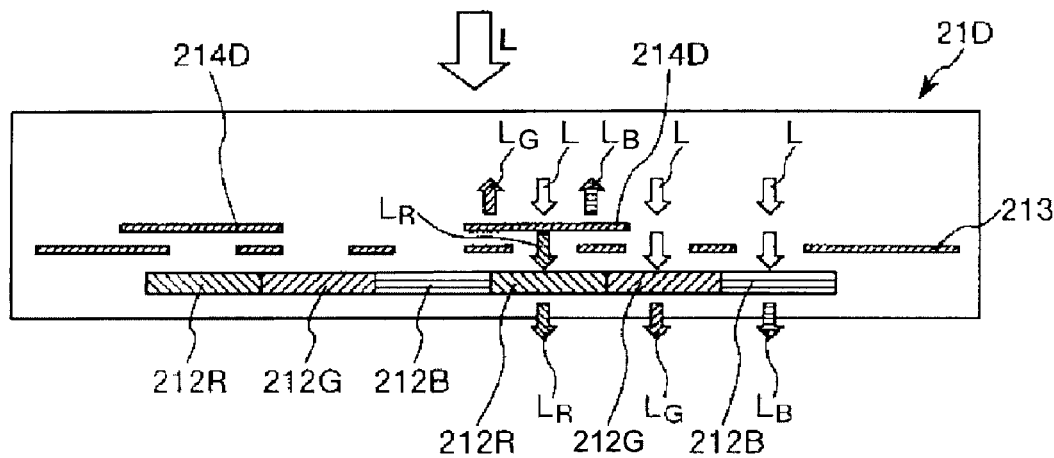

FIG. 9 is a schematic cross-sectional view for explaining the light modulation device provided to the display apparatus according to a second embodiment of the invention, and FIGS. 10A through 10C are schematic cross-sectional views for explaining modified examples of the light modulation device provided to the display apparatus according to the second embodiment of the invention.

The display apparatus according to the present embodiment is substantially the same as the display apparatus 1 according to the first embodiment described above except the difference in the configuration (mainly the arrangement of the light separation sections having the light separation surfaces) of the light modulation device.

It should be noted that in the explanation below the display apparatus of the second embodiment will be explained with a focus on the difference from the display apparatus of the first embodiment, and the explanation for the common issues will be omitted. Further, in FIG. 9, constituents substantially the same as those shown in FIG. 3 are denoted by the same symbols.

The display apparatus according to the present embodiment is provided with a color filter 21A instead of the color filter 21 in the display apparatus 1 according to the first embodiment described above, and at the same time, is provided with a substrate 211A for supporting the polarization layer 24. It should be noted that although the display apparatus is provided with a liquid crystal panel (the light modulation element) and the polarization layer having the same configuration as the liquid crystal panel 22 (the light modulation element) and the polarization layer 23 of the display apparatus 1 of the first embodiment described above on the opposite side to the polarization layer 24 with respect to the color filter 21A, illustration of the liquid crystal panel and the polarization layer is omitted in FIG. 9. Further, FIG. 9 shows each section of the color filter 21A schematically for the sake of convenience of explanation.

As shown in FIG. 9, the color filter 21A has a plurality of wavelength selection sections 212 (212R, 212G, and 212B), and on a surface of the layer (hereinafter also referred to as a "filter layer") composed of the plurality of wavelength selection sections 212, the surface being located near to the polarization layer 24, there are stacked a light blocking layer 213 having light reflectivity and a pre-filter layer 214A in this order from the filter layer side to the polarization layer 24 side.

The pre-filter layer 214A is formed so as to cover the light blocking layer 213 and the wavelength selection sections 212R, 212G except the area corresponding to the wavelength selection sections 212B. Thus, the light L transmitted through the polarization layer 24 is input to the wavelength selection sections 212B without being provided to the pre-filter layer 214A.

The pre-filter layer 214A has a property (hereinafter also referred to as a "filter function") of reflecting the light (specifically blue light LB) in the non-transmissive wavelength band of both of the wavelength selection sections 212R, 212G, and transmitting the light (specifically green light LG and red light LR) with other colors.

For example, the pre-filter layer 214A has a property of reflecting the light with wavelength shorter than 500 nm, and transmitting the light with wavelength equal to or longer than 500 nm. Thus, it is possible to make the blue light contribute to the excitation of the fluorescent substance 32 to thereby efficiently use the blue light, and at the same time, to increase an amount of blue light emitted from the liquid crystal panel 22 to thereby improve the display characteristic.

The pre-filter layer 214A described above can be formed of, for example, an element using a dielectric multilayer film (an optical multilayer thin film) or an autocloned photonic crystal. Further, when forming the pre-filter layer 214A, it can be manufactured with relative ease by, for example, evenly forming the dielectric multilayer film, and then removing the portions corresponding to the wavelength selection sections 212B by etching.

The plurality of wavelength selection sections 212 (the filter layer), the light blocking layer 213, and the pre-filter layer 214A described above are supported by a transparent substrate (not shown) having the same configuration as that of the substrate 211 of the first embodiment described above.

Here, the surfaces of the light blocking layer 213 and the pre-filter layer 214A on the side of the substrate 211A each form the light separation surface having a function of separating the light (the light having been transmitted through the polarization layer 24) from the light guide member 4 into the transmitted light transmitted toward the liquid crystal panel 22 side and the reflected light reflected toward the light guide member 4 side. It should be noted that the filter layer, the light blocking layer 213, and the pre-filter layer 214A can be assumed to be provided on substantially the same plane on the transparent substrate described above.

In the present embodiment, denoting the lateral cross-sectional area of the inside area of the tubular reflecting surface 41 including the apical surface of the light source 31 as $S_1$, the lateral cross-sectional area (the lateral cross-sectional area of the inside area of the tubular reflecting surface 41 including the light blocking layer 213 and the pre-filter layer 214A (the light separation surface)) of the inside area of the tubular reflecting surface 41 at the end thereof on the side near to the light blocking layer 213 and the pre-filter layer 214A (the light separation surface) as $S_2$, and the maximum incident angle at which the light from the light source 31 reflected by the tubular reflecting surface 41 is input to the light blocking layer 213 and the pre-filter layer 214A (the light separation surface) as O[°], the light guide member 4 is configured so that $\theta \times \sqrt{(S_2/S_1)}$ becomes equal to or greater than 110.

Further, in the present embodiment, the polarization layer 24 is disposed on the substrate 211A, which is separated from the transparent substrate described above for supporting the plurality of wavelength selection sections 212, the light blocking layer 213, and the pre-filter layer 214A.

As the substrate 211A, a transparent substrate having the same configuration as that of the substrate 211 of the first embodiment described above can be used.

Since as described above, the surfaces of the light blocking layer 213 and the pre-filter layer 214A form a primary light separation surface, the polarization layer 24 disposed on such a substrate 211A can be a layer having a light absorbing property.

In the display apparatus configured as described above, a part of the light L (white light) transmitted through the polarization layer 24 is transmitted through the pre-filter layer 214A without being provided thereto, and the remaining part thereof is provided (is input) to the pre-filter layer 214A as shown in FIG. 9.

A part (the blue light LB) of the light L input to the pre-filter layer 214A is reflected toward the polarization layer 24 side, and the remaining part (the yellow light LY (the light including the red light and the green light)) thereof is transmitted.

Thus, the blue light LB reflected by the pre-filter layer 214A is reused for excitation of the fluorescent substance 32 of the light source device 3. Further, a part of the yellow light LY transmitted by the pre-filter layer 214A reflects by the light blocking layer 213 having reflectivity toward the polarization layer 24 side to be reused, and the remaining part thereof is input to the wavelength selection sections 212R, 212G, and then converted into the red light LR and the green light LG, respectively.

On the other hand, the light L transmitted through the pre-filter layer 214A without being provided thereto is input to the wavelength selection sections 212B, and is converted into the blue light LB. As described above, by inputting the light L to the wavelength selection sections 212B without providing them to the pre-filter layer 214A, it is possible to prevent the loss of the light L, and to improve the intensity of the blue light LB emitted from the wavelength selection sections 212B.

Also by the display apparatus according to the present embodiment described above, substantially the same advantage as that of the display apparatus 1 according to the first embodiment described above can be exerted. In other words, the display apparatus according to the second embodiment can display high-intensity and high-quality images while achieving reduction of the power consumption.

It should be noted that the formation area (a formation pattern) of the pre-filter layer 214A is not limited to the disclosure of FIG. 9, but for example, those of modified examples 1 through 3 respectively shown in FIGS. 10A through 10C can also be adopted.

Here, based on FIGS. 10A through 10C, the modified examples 1 through 3 will be explained. It should be noted that each of the modified examples has substantially the same configuration as shown in FIG. 9 except the difference in the formation area and the reflection and transmission characteristics of the pre-filter layer.

Modified Example 1

As shown in FIG. 10A, in the color filter 21B of the modified example 1, the pre-filter layer 214B is disposed on the opposite side to the filter layer (the plurality of wavelength selection sections 212) with respect to the light blocking layer 213.

The pre-filter layer 214B is formed so as to cover the light blocking layer 213 and the wavelength selection sections 212G except the area corresponding to the wavelength selection sections 212R, 212B. Thus, the light L transmitted through the polarization layer 24 is input to the wavelength selection sections 212R, 212B without being provided to the pre-filter layer 214B.

The pre-filter layer 214B has a property of reflecting the light (specifically the red light LR and the blue light LB) in the non-transmissive wavelength band of the wavelength selection sections 212G, and transmitting the light (specifically the green light LG) with other colors.

Thus, it is possible to make the blue light contribute to the excitation of the fluorescent substance 32 to thereby efficiently use the blue light, and at the same time, to increase amounts of the blue light and the red light emitted from the liquid crystal panel 22 to thereby improve the display characteristic.

Modified Example 2

As shown in FIG. 10B, in the color filter 21C of the modified example 2, the pre-filter layer 214C is disposed on the opposite side to the filter layer (the plurality of wavelength selection sections 212) with respect to the light blocking layer 213.

The pre-filter layer 214C is formed so as to cover the light blocking layer 213 and the wavelength selection sections 212B except the area corresponding to the wavelength selection sections 212R, 212G. Thus, the light L transmitted through the polarization layer 24 is input to the wavelength selection sections 212R, 212G without being provided to the pre-filter layer 214C.

The pre-filter layer 214C has a property of reflecting the light (specifically the red light LR and the green light LG) in the non-transmissive wavelength band of the wavelength selection sections 212B, and transmitting the light (specifically the blue light LB) with other colors.

Thus, it is possible to increase amounts of the red light and the green light emitted from the liquid crystal panel 22 to thereby improve the display characteristic.

Modified Example 3

As shown in FIG. 10C, in the color filter 21D of the modified example 3, the pre-filter layer 214D is disposed on the opposite side to the filter layer (the plurality of wavelength selection sections 212) with respect to the light blocking layer 213.

The pre-filter layer 214D is formed so as to cover the light blocking layer 213 and the wavelength selection sections 212R except the area corresponding to the wavelength selection sections 212G, 212B. Thus, the light L transmitted through the polarization layer 24 is input to the wavelength selection sections 212G, 212B without being provided to the pre-filter layer 214D.

The pre-filter layer 214D has a property of reflecting the light (specifically the green light LG and the blue light LB) in the non-transmissive wavelength band of the wavelength selection sections 212R, and transmitting the light (specifically the red light LR) with other colors.

Thus, it is possible to increase amounts of the green light and the blue light emitted from the liquid crystal panel 22 to thereby improve the display characteristic.

The display apparatus according to each of the embodiments explained hereinabove can be applied to a projector apparatus, a liquid crystal television (monitor), and so on. In other words, the display apparatus described above can be used alone as a display. Further, the display apparatus described above can also be used by incorporating it into various electronic apparatuses having a primary function other than the function of displaying images.

Although the display apparatus according to the invention is explained hereinabove based on the illustrated embodiments, the invention is not limited to these embodiments. For example, in the invention the configuration of each section can be replaced with an arbitrary configuration exerting substantially the same function, and further, it is also possible to add an arbitrary configuration.

Further, the present invention can be a combination of any two or more of configurations (features) in each of the embodiments described above.

Further, although in the embodiments described above the explanation for the apparatus having the light source device using the light source and the fluorescent substance is presented, the fluorescent substance of the light source device can be eliminated in the invention. In this case, the light source such as a monochromatic LED or LD is used. Further, it is also possible to configure the apparatus to realize different colored light and substantially white light by combining monochromatic LEDs or the like with the wavelengths different from each other.

Further, although in the embodiments described above the apparatus for displaying full-color images is explained, the invention can be applied to apparatuses for displaying monochromatic images, dichromic images, and so on. For example, it is possible to display monochromatic images, dichromic images, and so on by using a color filter having monochromatic or dichromic wavelength selection sections, or eliminating the color filter.

Further, it is also possible to combine a plurality of display apparatuses for different colors to thereby display full-color images.

Further, although in the embodiments described above explanation is presented taking the case in which the inside surface of the hollow light guide member 4 forms the reflecting surface 41 for guiding light from the light source device 3 to the light modulation device 2 as an example, the light guide member 4 (the light guide section) can be formed of a solid member made of a transparent glass material or a transparent resin material. In this case, the inside of the solid member corresponds to the light guide area, and the outer surface of the solid member forms the reflecting surface for guiding light from the light source device 3 to the light modulation device 2.

The entire disclosure of Japanese Patent Application No: 2009-097702, filed Apr. 14, 2009 and 2010-008808, filed Jan. 19, 2010 are expressly incorporated by reference herein.

What is claimed is:

1. A display apparatus comprising:
a light modulation section having a plurality of translucent window sections;
a light emitting section having a light source adapted to emit light;
a light guide section having a tubular reflecting surface having a function of guiding the light from the light source to the light modulation section; and
a light separation section provided to the light modulation section and disposed at the light source side of the light modulation section in parallel to or in substantially parallel to a lateral cross-sectional surface of the tubular reflecting surface, and having a light separation surface having a function of separating the light from the light guide section into transmitted light transmitted toward the light modulation section and reflected light reflected toward the light guide section,
wherein the tubular reflecting surface narrows from the light modulation section side toward the light emitting section side so as to guide the reflected light to the translucent window sections,
denoting a lateral cross-sectional area of an inside area of the tubular reflecting surface at an end on the light source side as $S_1$, a lateral cross-sectional area of the tubular reflecting surface at an end on the light separation surface side as $S_2$, and a maximum incident angle at which the light from the light source reflected by the tubular reflecting surface is input to the light separation surface as 0°, $\theta \times \sqrt{(S_2/S_1)}$ is equal to or greater than 110.

2. The display apparatus according to claim 1, wherein the lateral cross-sectional area $S_1$ corresponds to a lateral cross-sectional area of the inside area of the tubular reflecting surface at an end near to the light source when an apical surface of the light source is located outer than the end of the tubular reflecting surface, and corresponds to a lateral cross-sectional area of the inside area of the tubular reflecting surface including the apical surface of the light source when the apical surface of the light source is located inner than the end of the tubular reflecting surface, and
the lateral cross-sectional area $S_2$ corresponds to a lateral cross-sectional area of the inside area of the tubular reflecting surface at an end near to the light separation surface when the light separation surface is located outer than the end of the tubular reflecting surface, and corresponds to a lateral cross-sectional area of the inside area of the tubular reflecting surface including the light separation surface when the light separation surface is located inner than the end of the tubular reflecting surface.

3. The display apparatus according to claim 1, wherein the light emitting section is disposed so as to cover one end of the inside area of the tubular reflecting surface, the light modulation section is disposed so as to cover the other end of the inside area of the tubular reflecting surface, and an area surrounded by the tubular reflecting surface, the light emitting section, and the light modulation section forms a closed area including the light source.

4. The display apparatus according to claim 1, wherein assuming one direction perpendicular to an axis line of the tubular reflecting surface as a first direction, and assuming a direction perpendicular to the axis line of the tubular reflecting surface and orthogonal to the first direction as a second direction,
a ratio $L_{11}/L_{12}$ between a length $L_{11}$ of the lateral cross-section of the inside area of the tubular reflecting surface at the end on the light source side in the first direction and a length $L_{12}$ of the lateral cross-section of the inside area of the tubular reflecting surface at the end on the light source side in the second direction is in a range of ¼ through 4, and
a ratio $L_{21}/L_{22}$ between a length $L_{21}$ of the lateral cross-section of the inside area of the tubular reflecting surface at the end on the light separation surface side in the first direction and a length $L_{22}$ of the lateral cross-section of the inside area of the tubular reflecting surface at the end on the light separation surface side in the second direction is in a range of ¼ through 4.

5. The display apparatus according to claim 1, wherein the light modulation section is provided with a polarization separation element adapted to transmit polarized light with a predetermined direction and reflect polarized light with a direction orthogonal to the predetermined direction disposed at the light source side of the light modulation section, and the polarization separation element has a function as the light separation surface.

6. The display apparatus according to claim 1, wherein a color filter having a plurality of wavelength selection sections is disposed in a vicinity of the light modulation section, at least one of the wavelength selection sections has a property of reflecting the light in a non-transmissive wavelength band, and the color filter has a function as the light separation surface.

7. The display apparatus according to claim 6, wherein the plurality of wavelength selection sections is composed of wavelength selection sections for respective wavelength bands different from each other.

8. The display apparatus according to claim 1, wherein a light blocking layer adapted to block light is partially disposed correspondingly to wiring provided to the light modulation section, and the light blocking layer has light reflectivity, and a function as the light separation surface.

9. The display apparatus according to claim 8, wherein a polarization separation element adapted to transmit polarized light with a predetermined direction and reflect polarized light with a direction perpendicular to the predetermined direction is disposed between the light blocking layer and the light modulation section.

10. The display apparatus according to claim 1, wherein the light applied to the light modulation section is arranged to become substantially white light.

11. The display apparatus according to claim 10, wherein color temperature of the light the light emitting section emits is arranged to become equal to or higher than 6500 K.

12. The display apparatus according to claim 1, wherein the light emitting section has a fluorescent substance disposed in a vicinity of the light source, and the light source emits excitation light for exciting the fluorescent substance.

* * * * *